United States Patent [19]
Kessler et al.

[11] Patent Number: 6,157,961
[45] Date of Patent: *Dec. 5, 2000

[54] CLIENT-SIDE STUB INTERPRETER

[75] Inventors: Peter B. Kessler; Graham Hamilton, both of Palo Alto; Jonathan J. Gibbons, Mountain View, all of Calif.

[73] Assignee: Sun Microsystems, Inc., Palo Alto, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/892,964

[22] Filed: Jul. 16, 1997

Related U.S. Application Data

[63] Continuation of application No. 08/119,753, Sep. 10, 1993, abandoned, which is a continuation-in-part of application No. 07/995,863, Dec. 21, 1992, Pat. No. 5,557,251.

[51] Int. Cl.[7] ............................................. G06F 9/46
[52] U.S. Cl. .................................... 709/315; 709/330
[58] Field of Search .................. 395/684; 709/100–108, 709/300–305

[56] References Cited

U.S. PATENT DOCUMENTS

| | | | |
|---|---|---|---|
| 4,989,132 | 1/1991 | Mellender et al. | 395/705 |
| 5,307,490 | 4/1994 | Davidson et al. | 395/650 |
| 5,452,447 | 9/1995 | Nelson et al. | 395/650 |
| 5,497,463 | 3/1996 | Stein et al. | 395/200.03 |
| 5,524,253 | 6/1996 | Pham et al. | 395/800 |
| 5,526,491 | 6/1996 | Wei | 395/200.09 |
| 5,566,302 | 10/1996 | Khalidi et al. | 709/300 |
| 5,577,251 | 11/1996 | Hamilton et al. | 709/101 |
| 5,778,228 | 7/1998 | Wei | 395/684 |

FOREIGN PATENT DOCUMENTS

| | | | |
|---|---|---|---|
| 03266064 | 11/1991 | Japan | G06F 15/16 |

OTHER PUBLICATIONS

Beck, Leland L., "System Software," Addison–Wesley, pp. 292, 293, 1990.

Peter B. Kessler, "A Client–Side Stub Interpreter," Proc. ACM Workshop on Interface Definition Languages, Jan. 1994.

"Remote Procedure Call" by Bruce Jay Nelson, May 1981.

The SPARC Architecture Manual (Version 8), pp. 189–204.

"The Design of a Stub Generator for Heterogeneous RPC Systems", Wei et al., Journal of Parallel and Distributed Computing, Mar. 1991, pp. 188–197.

12th Annual International Phoenix Conference of Computers and Communication, Mar. 1993, Arizona, USA, Yuasa and Sinha, "Network Programming support with object–oriented paradigm", pp. 495–501.

*Primary Examiner*—Alvin E. Oberley
*Assistant Examiner*—St. John Courtenay, III
*Attorney, Agent, or Firm*—Sabath & Truong; Bobby K. Truong; Christine S. Lam

[57] ABSTRACT

The present invention provides an elegant and compact way to provide mechanisms for invocation of objects by client applications and for argument passing between client applications and object implementations, which reduce the memory space required for the client-side stubs, without the client application or the operating system knowing the details of how these mechanisms work. Moreover, these mechanisms function in a distributed computer environment with similar ease and efficiency, where client applications may be on one computer node and object implementations on another. Additionally the invention is independent of the particular C++ compiler used for generation of the stub code. The mechanism used to reduce this memory space comprises a stub generator (called "CONTOCC"), a data base of client-side stub description files and a stub-interpreter which knows how to read these client-side stub description files. CONTOCC reads interface definition language ("IDL") files and generates corresponding C++ files. CONTOCC has the ability to read the IDL data and generate either normal C++ stub files or the special client-side stub description files.

30 Claims, 16 Drawing Sheets

CLIENT - SIDE STUB INTERPRETER COMPONENTS

REMOTE OBJECT INVOCATION USING SUBCONTRACT

OBJECT INVOCATION ON A SINGLE MACHINE USING SUBCONTRACT

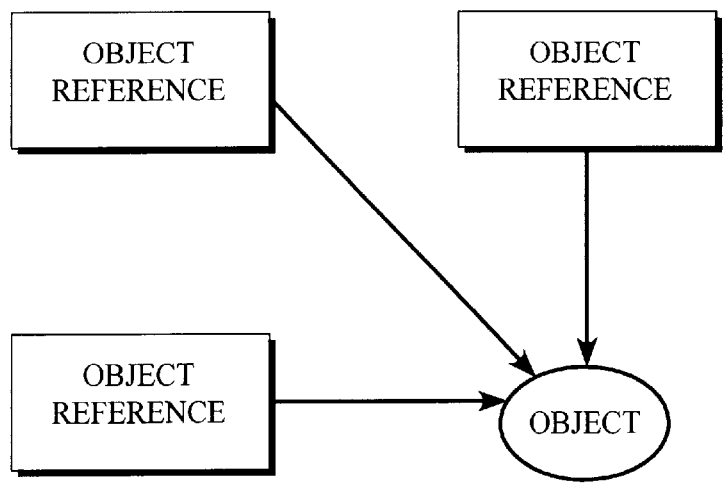
Fig. 10A (Prior Art)
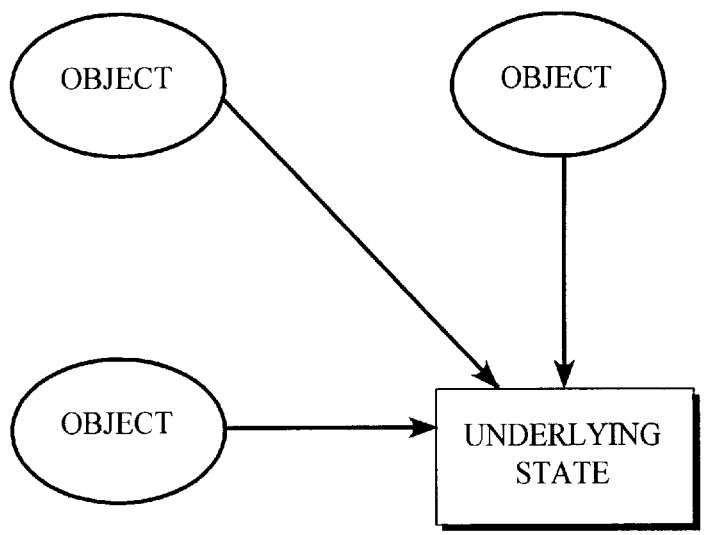
Fig. 10B (Spring Environment)

Layout of the client-side stub description

The layout of a stub description can be pictured as:

| | |
|---|---:|
| 200 number of unmarshal, etc. methods | [4 bytes] |
|     pointer to 1st unmarshal, etc., method | [4 bytes] |
|     ... | ... |
|     pointer to last unmarshal, etc., method | [4 bytes] |
| | |
| 202 number of exceptions | [4 bytes] |
|     1st exception code | [4 bytes] |
|         pointer to 1st exception method | [4 bytes] |
|     ... | ... |
|     last exception code | [4 bytes] |
|         pointer to last exception method | [4 bytes] |
| | |
| 204 1st function code | [4 bytes] |
|     206 distance to beginning of description | [4 bytes] |
|     208 1st mode of 1st function, 1st type of 1st function | [1 bytes] |
|         index of unmarshal, etc. method for 1st arg | [0..4 bytes] |
|     ... | ... |
|     210 return mode, type of 1st function | [1 byte] |
|         index of unmarshal, etc. method for last arg | [0..4 bytes] |
|     212 null padding, if needed | [0..3 bytes] |
|     ... | ... |
| 204 last function code | [4 bytes] |
|     206 distance to beginning of description | [4 bytes] |
|     208 1st mode of last function, 1st type of last function | [1 bytes] |
|         index of unmarshal, etc. method for 1st arg | [0..4 bytes] |
|     ... | ... |
|     210 return mode, type of last function | [1 byte] |
|         index of unmarshal, etc. method for last arg | [0..4 bytes] |
|     212 null padding, if needed | [0..3 bytes] |

Fig. 11

CLIENT-SIDE STUB INTERPRETER

CROSS-REFERENCE TO RELATED APPLICATION

This is a continuation of application Ser. No. 08/119,753 filed Sep. 10, 1993, now abandoned, which is a continuation in part of 07/995,863, filed Dec. 21, 1992.

This is a continuation-in-part application to U.S. Pat. No. 5,557,251 issued Nov. 19, 1996, formerly U.S. patent application Ser. No. 07/995,863 filed by Graham Hamilton, Michael L. Powell, James G. Mitchell and Jonathan J. Gibbons for "A Method and Apparatus for Subcontracts in Distributed Processing Systems", filed Dec. 21, 1992.

BACKGROUND OF THE INVENTION

1. Field of the Invention

The present invention relates to the fields of distributed computing systems, client-server computing and object oriented programming. Specifically, the present invention is a method and apparatus comprising logic modules, called a client-side stub generator and a client-side stub interpreter, that have been designed to minimize the memory space required by client-side stubs.

2. Background

A key problem in Operating Systems development and maintenance is permitting the introduction of new interfaces and implementation techniques in a way which allows clients and programmers maximum flexibility without loading the operating system down with implementation details. Moreover, this problem becomes more intense when developing object oriented operating systems which have micro-kernel architectures. Micro-kernels typically permit clients to implement complex sub-systems at the client level, such as file systems, for example. Nevertheless, basic system processes such as interclient or intercomputer communications are so complex that clients and object implementors should not be concerned with these processes. That is, these inherently "system" type processes are more efficiently done by standard modules, but should be handled in a way which does not require that the base operating system is constrained by these processes.

As a part of the solution to this basic problem for systems which use the object metaphor to define the interfaces between different components of a system, stubs and other similar types of intermediate logic modules have been used. Such stubs are described as standard modules to handle communications of object calls between remote computers which may be sending other objects as parameters of the calls. These stubs and other similar modules and their relationship to each other are described more fully below within the context of the detailed description of this invention comprising the stub generator and stub interpreter.

In an object oriented system, an object is a component comprising data and operations which can be invoked to manipulate the data. The operations are invoked on the object by sending calls to the object. Each object has an object type. The object type defines the operations that can be performed on objects of that type. The object operations are implemented independent of the objects themselves. Additionally, one object type may inherit the object operations defined and implemented for other object types. For further description of object oriented design and programming techniques see "Object-oriented Software Construction" by Bertrand Meyer, Prentice-Hall 1988.

In client-server computing, typically there is a set of computers that can communicate with one another through a network connecting the computers. Some of these computers act as providers of services or functionality to other computers. The providers of such service or functionality are known as "servers", and the consumers of such service or functionality are called "clients". The client-server model also generalizes to the case where distinct programs running on the same computer are communicating with one another through some protected mechanism and are acting as providers and consumers of functionality.

In object oriented distributed systems based upon the client-server model, there exist servers that provide object oriented interfaces to their clients. These servers support objects consisting of data and the associated software. Clients may obtain access to these objects and may execute calls on them. These calls are transmitted to the server from the client. At the server these calls are executed via the software associated with the object. The results of these calls are then transmitted back to the client.

In more modern systems, the application software does not talk directly to the network software. Instead the application software talks to "stubs" (14 in FIG. 1). The stubs provide a consistent interface to the clients whether there is a network between the client and server or not. There is a distinct stub for each distinct interface that is supported by the system. The stub code is responsible for converting between a specific language-level interface seen by application level software and the standard low-level communication interfaces provided by the network software. For example, the stubs are responsible for taking the arguments to a remote call and putting them into a message suitable for the network software to transmit over the network. Such uses of stubs are described in the section on Remote Procedure Calls ("RPC") on pages 349–368 of the book titled "Software Implementation Techniques" by Donald E. Merusi, Digital Press 1992, ISBN 1-55558-090-4.

Because of the number of client-side stubs which are generated in such object oriented, distributed systems it has become clear that a mechanism is needed to reduce the text memory space occupied by the code related to these many client-side stubs.

Accordingly, the present invention provides an apparatus and a method comprising logic modules, called a client-side stub generator, a database of compressed client-side stub execution code and a client-side stub interpreter, that have been designed to minimize the memory space required by client-side stubs while retaining the design of stubs to provide control of the basic mechanisms of object invocation and argument passing that are most important in distributed systems, and which permits the application programmers to be unaware of the specific stubs that are being used for particular objects.

SUMMARY OF THE INVENTION

The present invention provides an elegant and compact way to provide mechanisms for invocation of objects by client applications and for argument passing between client applications and object implementations, which reduce the memory space required for the client-side stubs, without the client application or the operating system knowing the details of how these mechanisms work. Moreover, these mechanisms functions in a distributed computer environment with similar ease and efficiency, where client applications may be on one computer node and object implementations on another. Additionally the invention is independent of the particular C++ compiler used for generation of the stub code.

A method and apparatus are described for executing a particular stub operation invoked by a client in a computer system by accessing from a first area of computer memory a first portion of code required to execute the stub operation, this first portion of code identified as code which is common to a plurality of different stub methods; and accessing from a second portion of computer memory a second portion of code which code is unique to the particular stub operation invoked. This permits a reduction in the required computer memory because the code common to a plurality of stub methods is stored only once.

Additionally a method and apparatus provide for the process of separating code generated for executing a stub operation into a first portion of code which is common to a plurality of stub methods, and a second portion of code which is unique to each stub operation and for storing this second portion of code into computer memory in a compressed format using byte code representations of the various methods, texts and parameters. A single copy of the portion of code which is common to a plurality of stub methods is contained in a mechanism called a stub interpreter which supplies this portion of common code whenever a stub operation is invoked by a client. The stub interpreter accesses memory to obtain the unique portion of stub code required to complete a stub method whenever one is invoked.

The mechanism used to reduce this memory space comprises a stub generator (called "CONTOCC") for generating a data base of compressed client-side stub description files which are stored in computer memory and a stub-interpreter which knows how to read these client-side stub description files. CONTOCC reads interface definition language ("IDL") files and generates corresponding C++ files. CONTOCC has the ability to read the IDL data and generate either uncompressed C++ stub files or the special compressed client-side stub interpreter files which contain only those data that are unique to the particular stub method involved in byte coded form.

The stub interpreter logic module receives a target object, arguments related to the particular stub method called and a pointer to the compressed byte code representations of the stub code in the data base of compressed client-side stub description files which are stored in computer memory, and proceeds to execute the object invocation, marshalling or unmarshalling of any return messages as required.

DESCRIPTION OF THE DRAWINGS

The objects, features and advantages of the system of the present invention will be apparent from the following description in which:

FIGS. 10a & 10b illustrate the SPRING view of objects versus the prior art view of objects.

FIG. 11 illustrates an exemplary layout of the client-side stub description.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

The following disclosure describes a unique and innovative method and apparatus for reducing the total memory space occupied by computer code that performs stub operations in a computing environment that comprises object-oriented, client-server, distributed computing operations.

Figure 1:
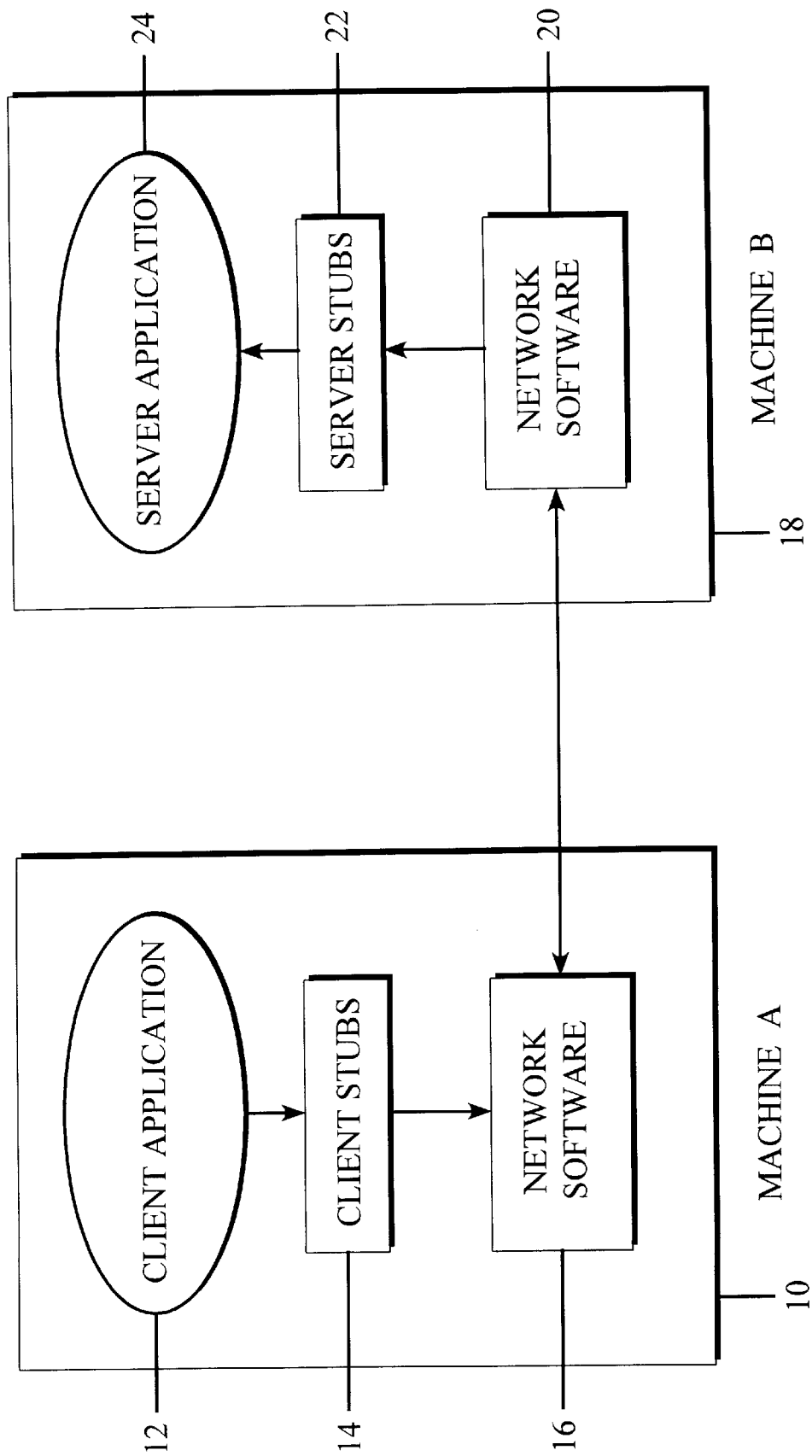
FIG. 1 illustrates the prior art relationship of client and server applications to stubs and network software.
Figure 2:
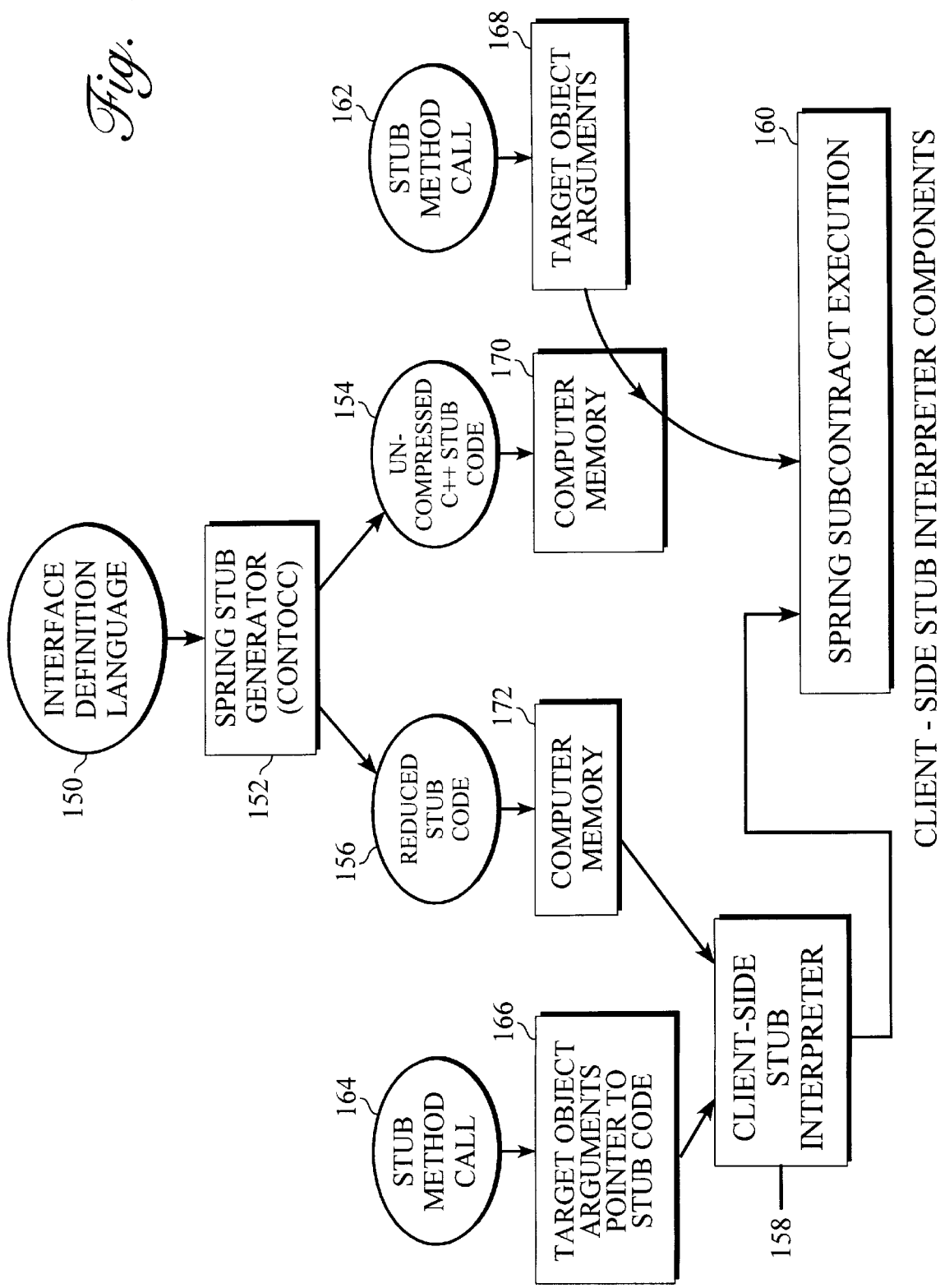
FIG. 2 illustrates the major system components of the Stub Generator/Interpreter.

Referring now to FIG. 2, the invention is depicted. The invention comprises aclient-side stubgenerator ("CONTOCC") 152 which receives Interface Definition Language ("IDL") code 150 as input, and, if required, generates the data base of reduced code and tables for client-side stubs 156, or generates normal C++ stub code 154 as required, and a run-time client-side stub interpreter 158 which can execute the client-side stub functions of marshalling, unmarshalling and object invocation. A normal stub method call 162 is indicated which passes the target object and arguments to the method being invoked 168, and which executes the method via the normal stub code stored in computer memory 170. Also shown is a stub method call 164 of the type used with the stub interpreter 158, which also passes the target object and arguments to the method being invoked, but in addition passes a pointer to the reduced stub code 166 in computer memory 172, whereby the stub interpreter 158 can execute the method call. These components of the invention are described more fully below after a brief description of the operating environment in which the preferred embodiment of the invention is implemented.

In the following description, for purposes of explanation, specific data and configurations are set forth in order to provide a thorough understanding of the present invention. The preferred embodiment described herein is implemented in a computing environment which includes a new type of object, termed a "spring object," which includes a method table, a subcontract mechanism and a data structure which represents a "subcontract's" local private state, all of which is operating under the control of the Sun Microsystems, Inc. ("Sun") SPRING Object Oriented Operating System ("SPRING"). Those skilled in the art will recognize that the client-side stub interpreter and the underlying process may be practiced without the specific details described herein and may be implemented in various computer systems and in various configurations, or makes or models of tightly-coupled processors or in various configurations of loosely-coupled multiprocessor systems.

A SPRING object is an abstraction that contains state and provides a set of methods to manipulate that state. The description of the object and its methods is an interface that is specified in the interface definition language ("IDL"). The interface is a strongly-typed contract between the implementor (server) and the client of the object.

A SPRING domain is an address space with a collection of threads. A given domain may act as the server of some objects and the clients of other objects. The implementor and the client can be in the same domain or in a different domain.

Since SPRING is object-oriented it supports the notion of interface inheritance. SPRING supports both notions of single and multiple interface inheritance. An interface that accepts an object of type "foo" will also accept an instance of a subclass of "foo". For example, the address_space object has a method that takes a memory_object and maps it in the address space. The same method will also accept file and frame_buffer objects as long as they inherit from the memory_object interface.

The SPRING kernel supports basic cross domain invocations and threads, low-level machine-dependent handling, as well as basic virtual memory support for memory mapping and physical memory management A SPRING kernel does not know about other SPRING kernels—all remote invocations are handled by a network proxy server. In addition, the virtual memory system depends on external pagers to handle storage and network coherency.

A subcontract mechanism is associated with each object. Each subcontract contains a client-side portion and a related server-side portion. Each object type has an associated subcontract. The client-side portion of a subcontract has the ability to generate a new spring object, to delete a spring object, to marshal information about its associated object into a communications buffer, to unmarshal data in a communications buffer which represents its associated object, to transmit a communications buffer to its associated server-side subcontract, which includes either transmitting an object from one location to another or transmitting a copy of an object from one location to another. The server-side portion of the subcontract mechanism includes the ability to create a spring object, to provide support for processing incoming calls and related communications buffers and to provide support for revoking an object.

The Spring Object Model

SPRING has a slightly different way of viewing objects from other distributed object oriented systems and it is necessary to clarify this before discussing the details of the stub interpreter, stubs and subcontract.

Most distributed systems present a model wherein objects reside at server machines and client machines possess "object handles" that point to the object at the server. (See FIG. 10*a*.) So clients pass around object handles rather than objects.

SPRING presents a model wherein clients are operating directly on objects, not on object handles. (See FIG. 10*b*.) Some of these objects happen to keep all their interesting state at some remote site, so that their local state merely consists of a handle to this remote state. An object can only exist in one place at a time, so if we transmit an object to someone else then we cease to have the object ourselves. However, we can also copy the object before transmitting it, which might be implemented such that there are now two distinct objects pointing to the same remote state.

So whereas in most systems, one might talk of several clients having object handles that reference some remote object, in SPRING one would talk about several clients having objects that reference the same remote state.

For most server-based objects this distinction is mainly one of terminology. However SPRING also supports objects which are not server based, or where the state of the object is split between the client and the server. In these cases it is much more convenient to regard the client as possessing the true object, rather than merely possessing a pointer.

The Interface Definition Language

The unifying principle of SPRING is that all the key interfaces are defined in a standard interface definition language. This language is object-oriented and includes support for multiple inheritance. It is purely concerned with interface properties and does not provide any implementation information.

From the interface definition language it is possible to generate language-specific stubs. These stubs provide a language-specific mapping to the SPRING interfaces. For example, in the main implementation language, C++, Spring objects are represented by C++ objects. When a method on a stub object is invoked, it will either perform a local call within the current address space or forward the call to another address space, which may be on a different machine.

Stubs and the Subcontract Mechanism

Figure 4:
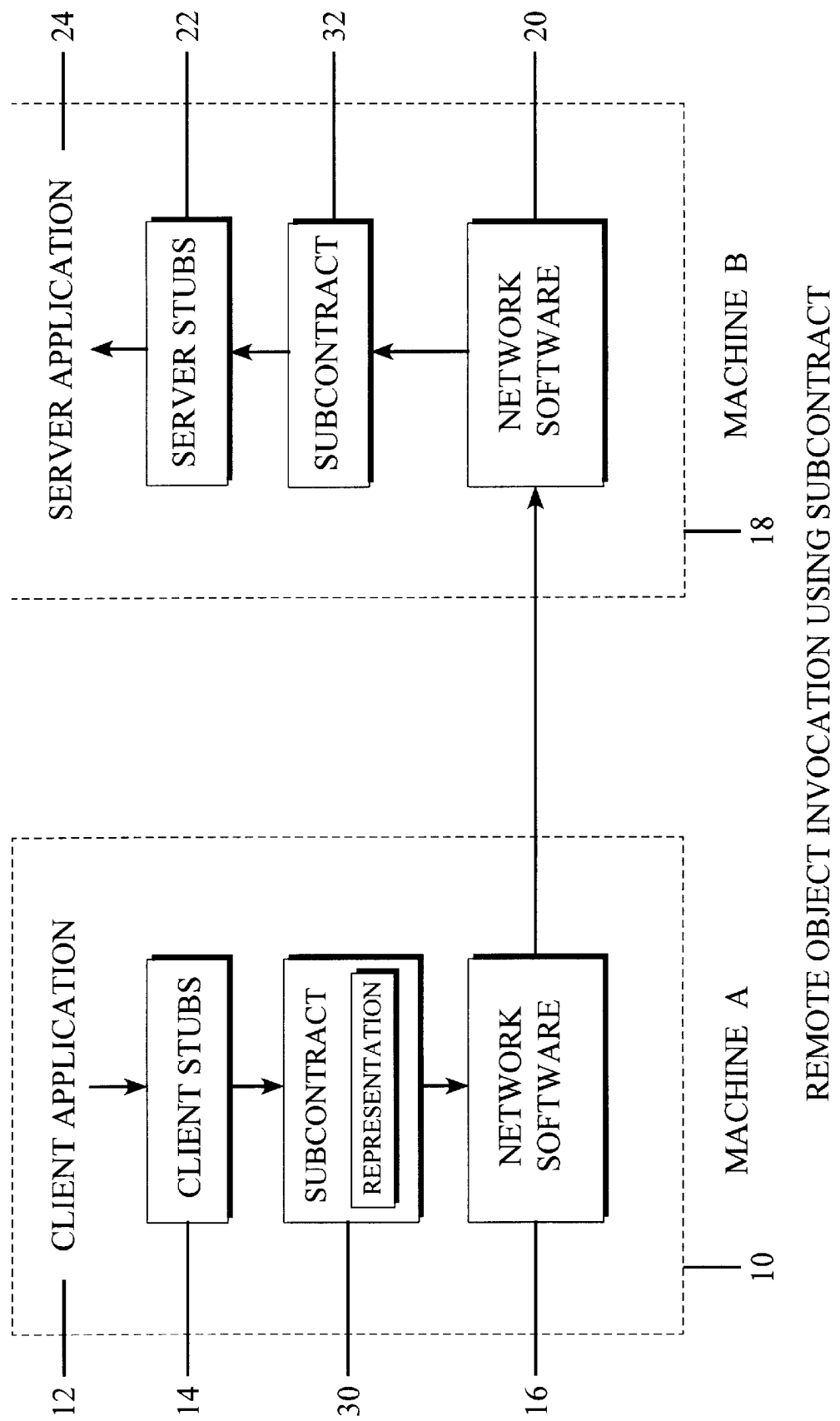
FIG. 4 illustrates remote object invocation using subcontract.

Referring now to FIG. 4, in the environment of the present invention, the client application 12 on a machine 10, issues calls to the appropriate client-side stub 14, who calls upon a client-side portion of a "Subcontract" 30, which subcontract talks to the network software 16 which communicates with its counterpart network software 20, generally on another machine 18. This server-side network software 20 transfers incoming messages to the server-side portion of subcontract 32 who in turn delivers the data to the server-side stub 22 which passes the data to the server application 24 which is typically the object implementation. As indicated, Subcontract fits between the stubs and the network software. The stubs use a subcontract to perform remote calls and similarly the subcontract then uses the network software to perform the actual call. Different subcontracts will implement different kinds of remote communication protocols (for replication, for caching, etc) on top of the standard communications software.

Figure 5:
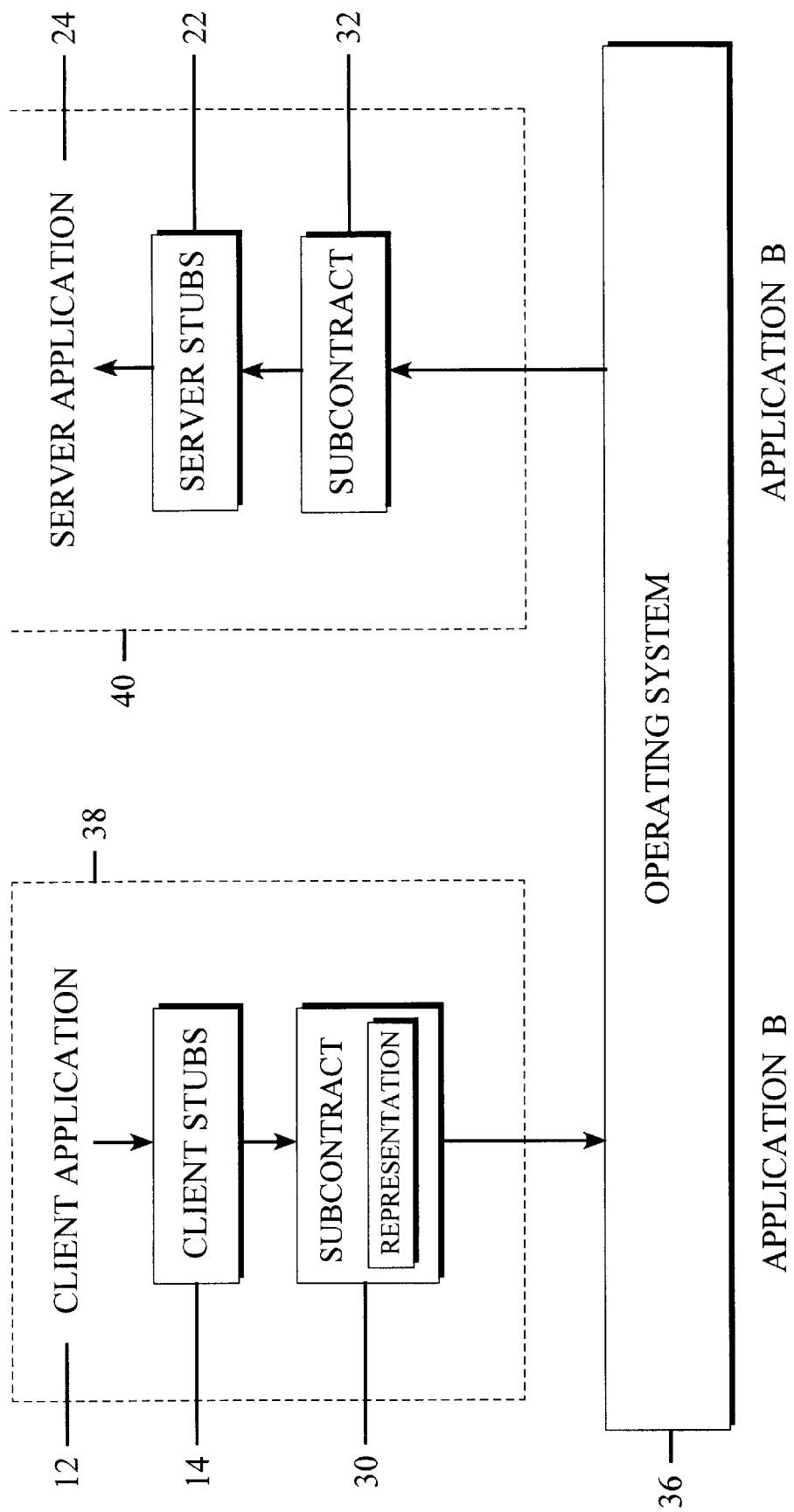
FIG. 5 illustrates object invocation on a single machine using subcontract.

Within a single computer, different applications may also use subcontract to communicate. Referring now to FIG. 5, the client application 12 is in an application space 38 and issues calls on the appropriate client-side stub 14, who in turn calls the appropriate subcontract 30. The subcontract 30 transfers its communications to the operating system 36, which relays them to the server-side subcontract 32, who in turn gives the data to its server-side stub 22 who passes the data to the server application 24. In this case inter-process communication primitives provided by the operating system 36 replace the inter-machine communication mechanisms provided by the networking software (16 & 20 in FIG. 4).

Even within a single application running in a single address space, client-side and server-side stubs and subcontract may be used to communicate between different components of the application.

Figure 3:
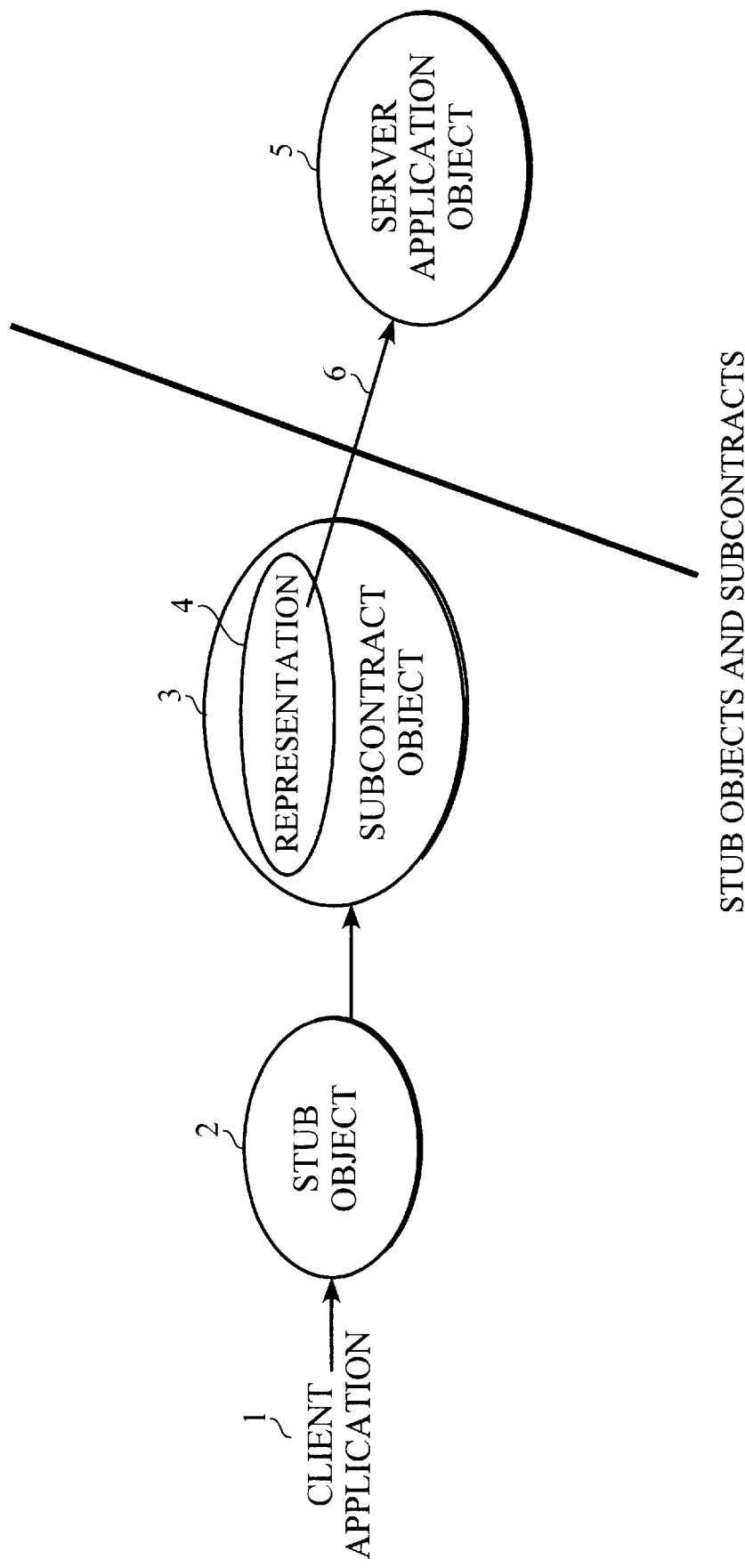
FIG. 3 illustrates the relationship between stub objects, subcontract objects and server application objects.

Now, referring to FIG. 3, looking at things from an object-oriented perspective, the client application 1 operates in terms of "stub objects" 2. Each of these stub objects 2 contains a subcontract object 3 whose internal state 4 (known as its "representation") may contain some form of pointer 6 to the real underlying state 5, which may reside in the same address space, in another address space on the same machine, or on another machine entirely. The underlying state will typically be itself represented as an object 5 in the server application's address space.

A Spring object is perceived by a client as consisting of three things: a method table, which contains an entry for each operation implied by the object's type definition; a subcontract description which specifies the basic subcontract operations described in the next section; and some local private state, which is referred to as the object's representation.

A client interacts with an object by invoking methods on what appears to be a C++ object. The code for this object has in fact been automatically generated and it transforms the method invocations into calls on either the object's regular method table or on its subcontract operations vector. How these methods achieve their effect is hidden from the client but involve calls to the appropriate stub method, which operations are described below.

If the object is implemented by a remote server, then a typical arrangement will be that the subcontract implements the machinery for communicating with the remote server, while the method table consists of pointer to stub methods whose sole duty is to marshal the arguments into a buffer, call the subcontract to execute the remote call and then unmarshal any results from the reply buffer. SPRING provides an automatic stub generator ("CONTOCC") to generate appropriate stubs from the interface definition language. It is this automatic stub generator and the client-side stub interpreter process which is the subject on this invention disclosure. In order to properly describe the role of the invention, it is necessary to further describe how the client and server side stubs are used by the system.

In the remote serverthere will typically be some subcontract code toperform any subcontract work associated with incoming calls and some server side stub code that unmarshals the arguments for each operation and calls into the server application. This server stub code is also automatically generated by CONTOCC. However, as is described later, the stub interpreter of the preferred embodiment is directed only to client-side stubs, although those skilled in the art will recognize that the same principles can be used with server-side stubs.

If an object is implemented entirely locally, then it is possible to avoid using stub methods and to provide implementation methods that can be placed directly into the method table. SPRING provides support for generating method tables in this case.

Basic Subcontract Mechanisms

The client side subcontract operations are:

copy consume unmarshal marshal marshal_copy invoke invoke_preamble narrow object_type_id object_manager_id is_null These subcontract operations and detailed descriptions thereof are described in the co-pending application Ser. No. 07/995,863 filed by Graham Hamilton, Michael L. Powell, James G. Mitchell and Jonathan J. Gibbons for A Method and Apparatus for Subcontracts in Distributed Processing Systems which is hereby incorporated herein by reference. An example of subcontract usage and the interaction of the client and server side stubs with the subcontract mechanism are described herein briefly.

An Example of Stub and Subcontract Use

Before describing the present invention in detail, it is useful to consider the sequence of stub and subcontract operations performed when invoking a remote object. Note that this is only an example, and those skilled in the art will realize that subcontracts as defined herein and in the copending reference indicated above, can be made to do much more exotic things than are described here. Please refer in the following discussion to FIGS. 6 through 9.

Assume that we have an object A which supports a method Fred and which uses a subcontract SA.

```
interface A {
    fruitbat fred(copy wombat x);
};
```

The return type fruitbat is known to use some subcontract SF.

Figure 6:
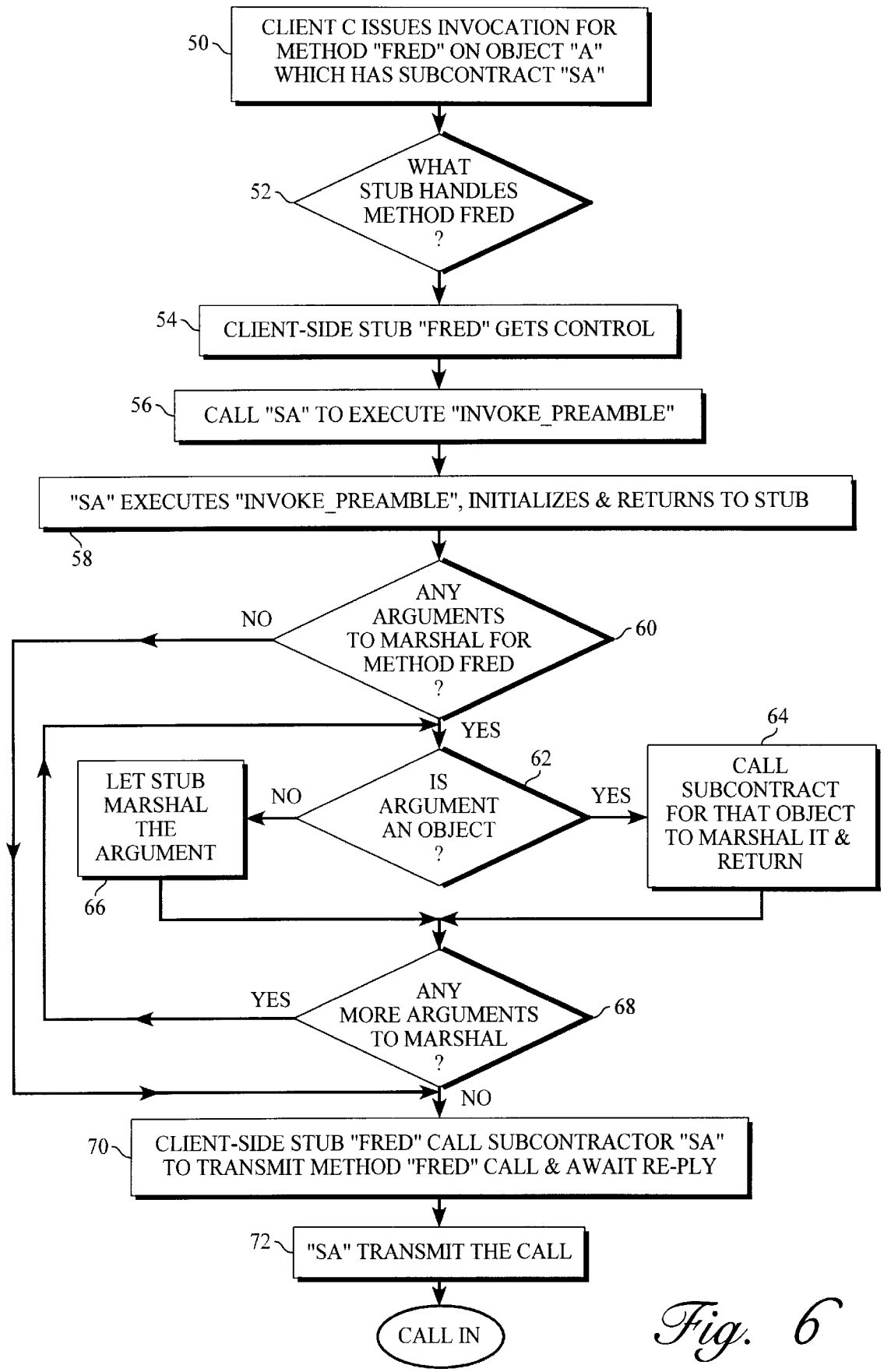
FIGS. 6–9 illustrate a flow chart of an exemplary use of the inventive method of subcontract.

Say we have an object X of type wombat which uses a subcontract SX, and we call A's fred method passing in X as an argument 50:

1. First we enter the client-side stub method for "fed" 52,54.
2. The client-side stub code calls A's invoke_preamble operation 56.
3. The SA invoke_preamble code performs any necessary initialization and returns 58.
4. The client-side stub code then attempts to marshal the argument object X as a copy argument, by invoking X's marshal_copy operation. In FIG. 6 this proceeds as follows: client-side stub fred makes a test to see if there are any arguments to be marshaled 60. Since the answer is yes, then stub fred tests the arguments to see if any are objects 62. Finding object X and knowing that X has a subcontract SX, stub fred calls subcontract SX to marshal object X 64.

Figure 7A:
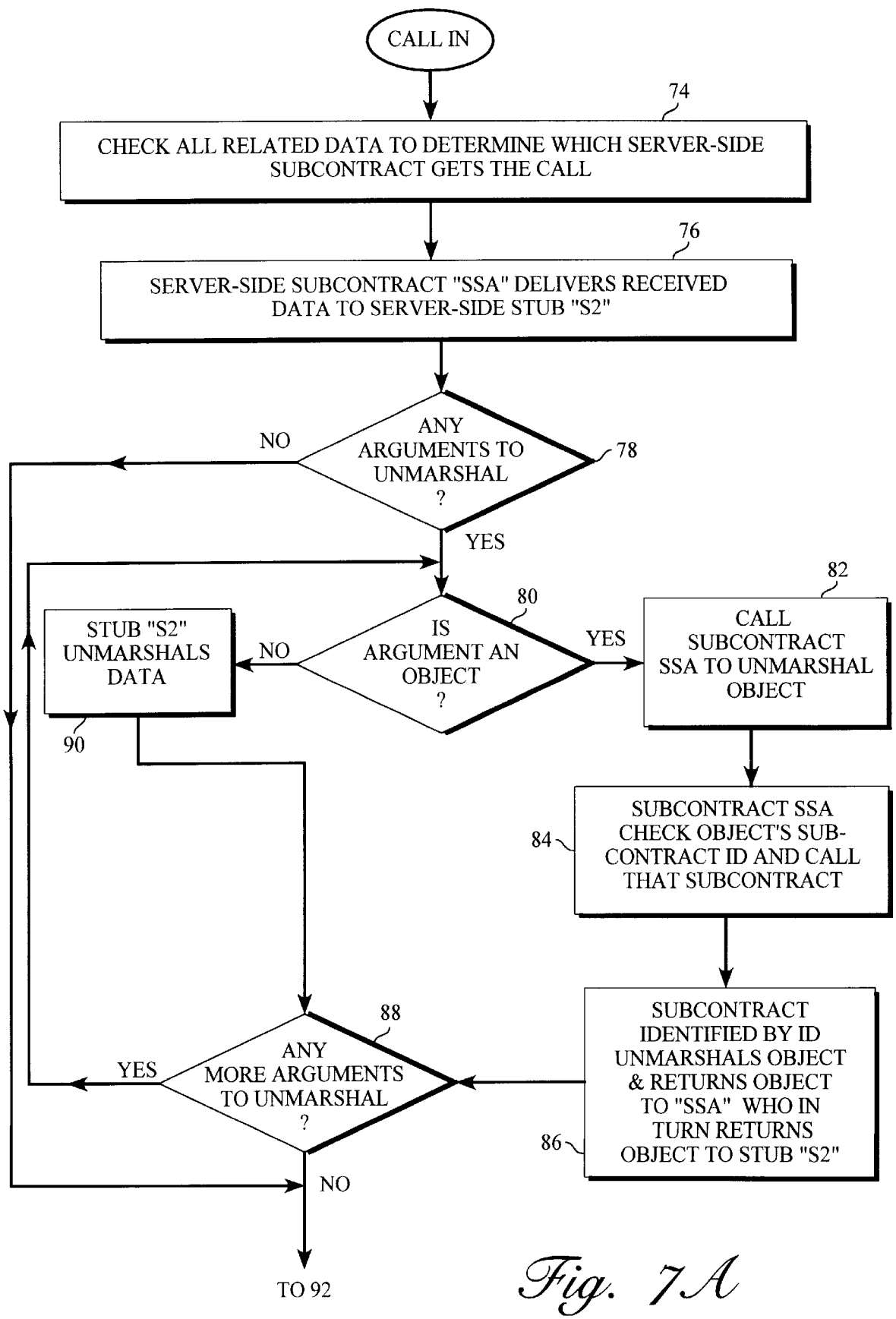
Figure 7B:
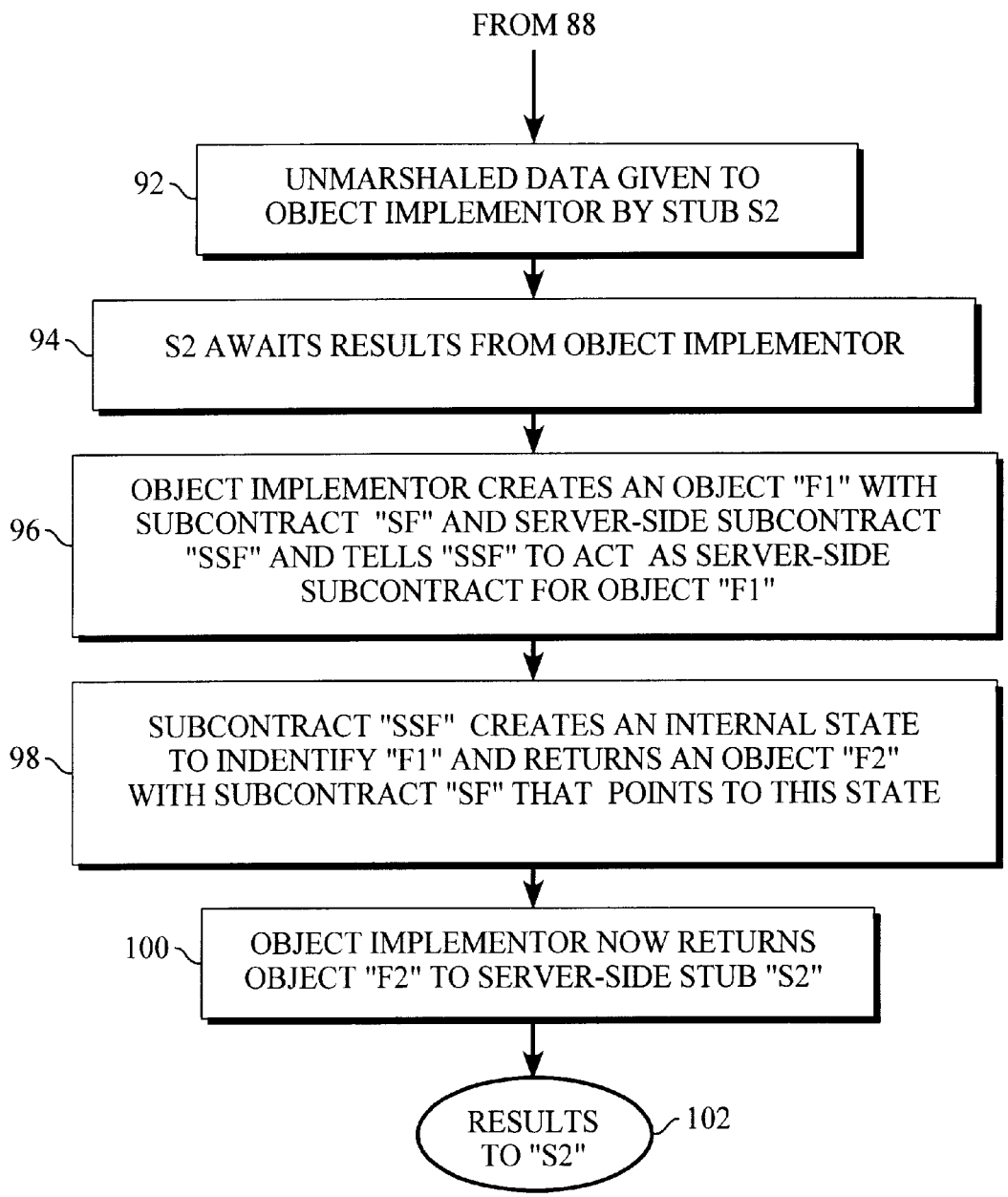
Figure 8:
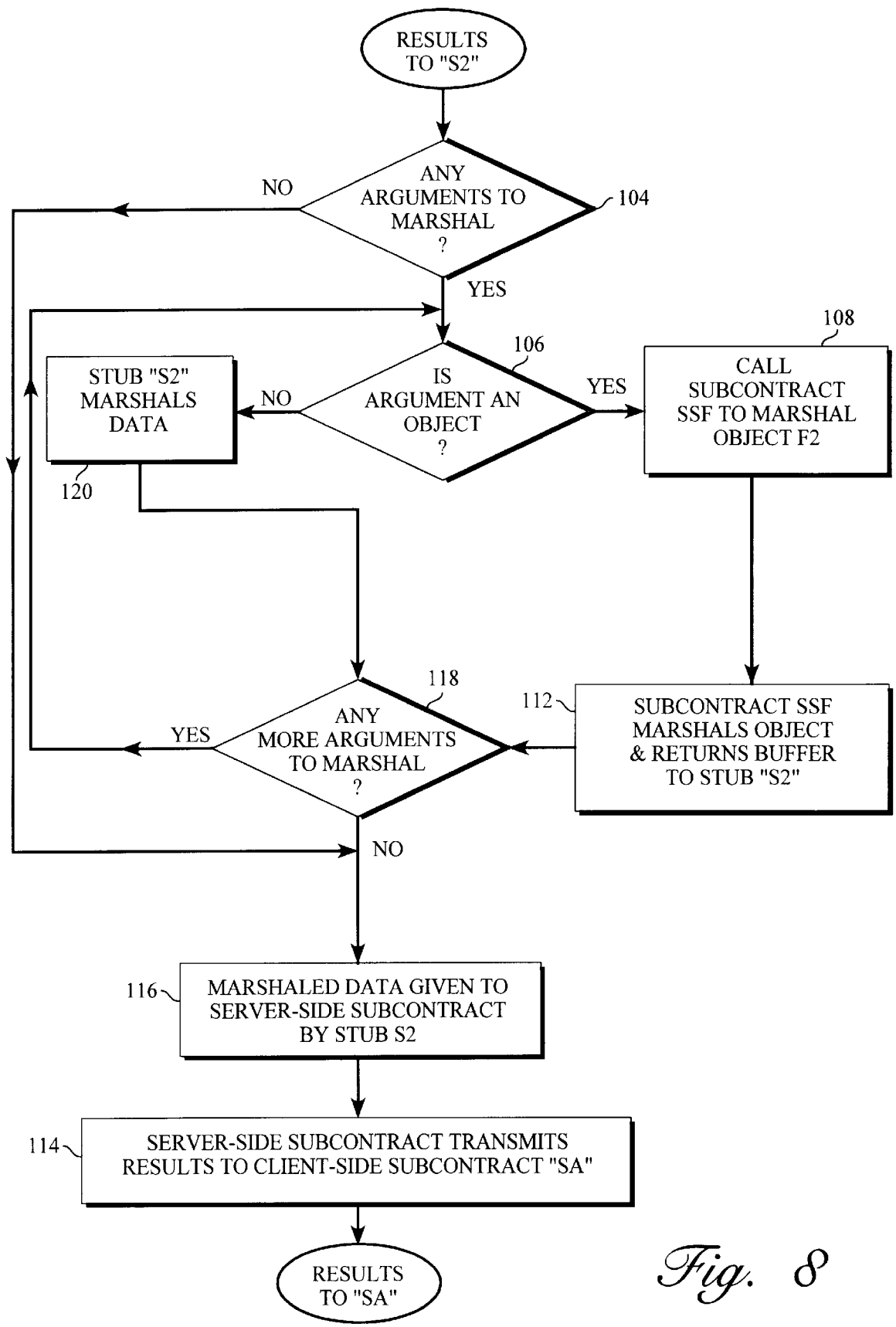
Figure 9:
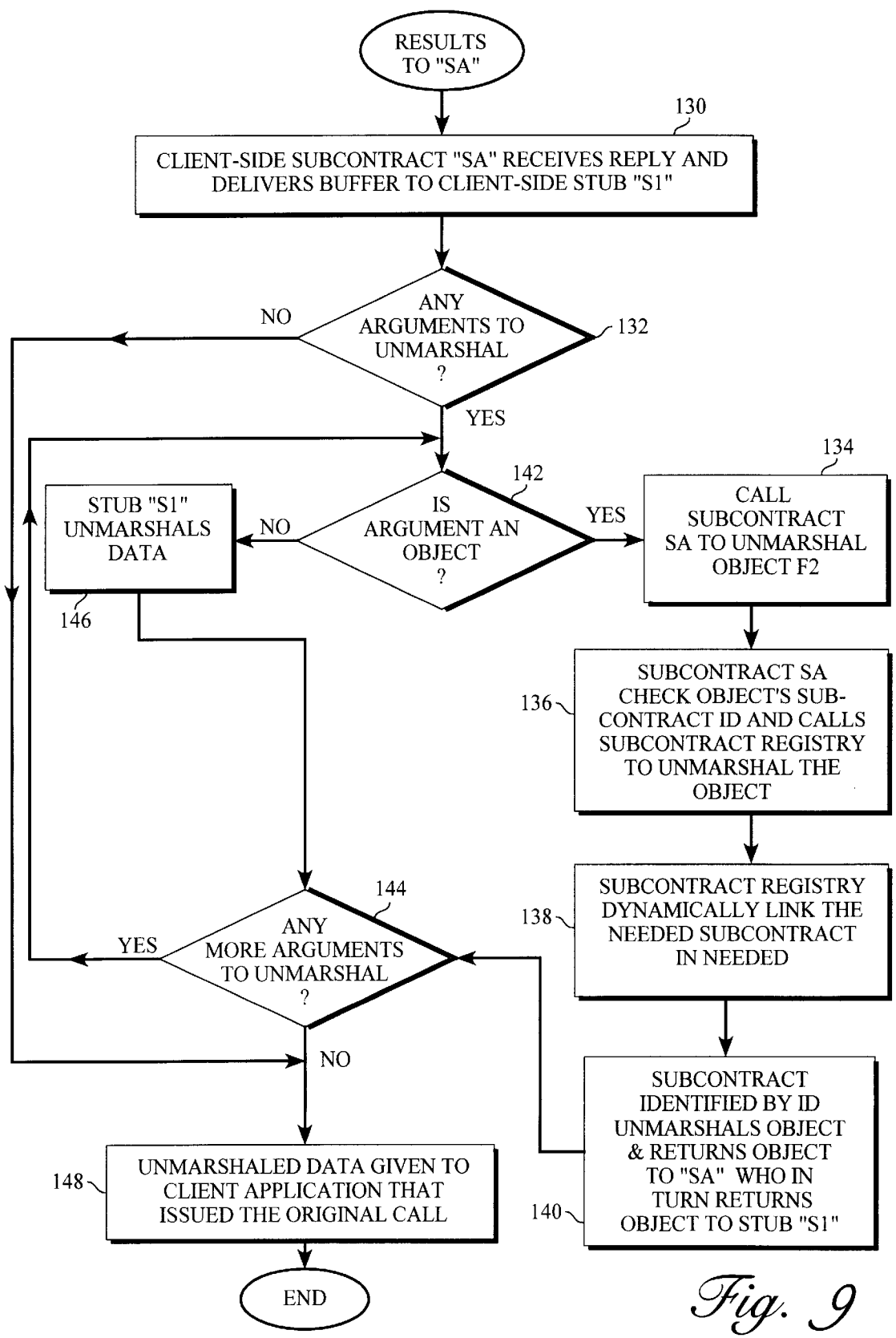
Figure 12:
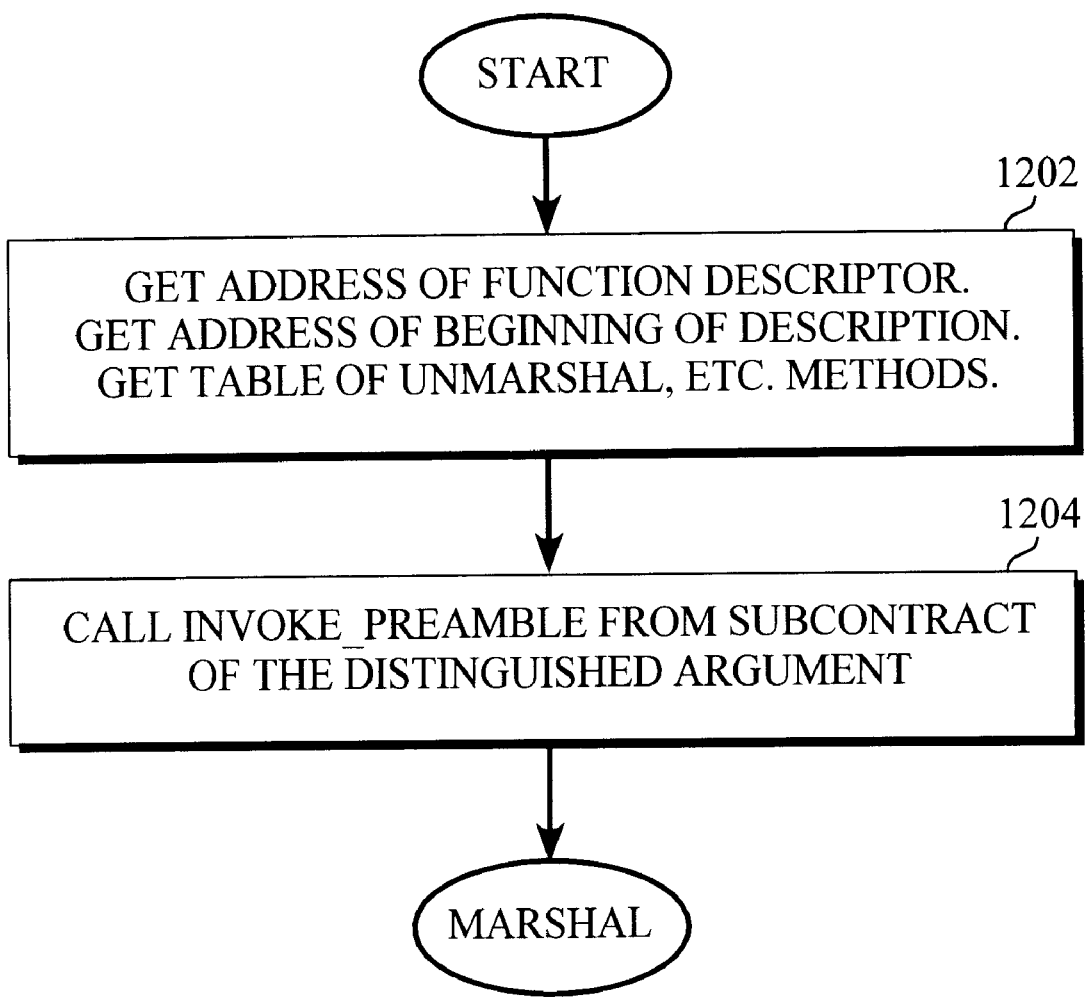
FIGS. 12–15 illustrate a flow chart of an exemplary operation of the client-side stub interpreter.
Figure 13:
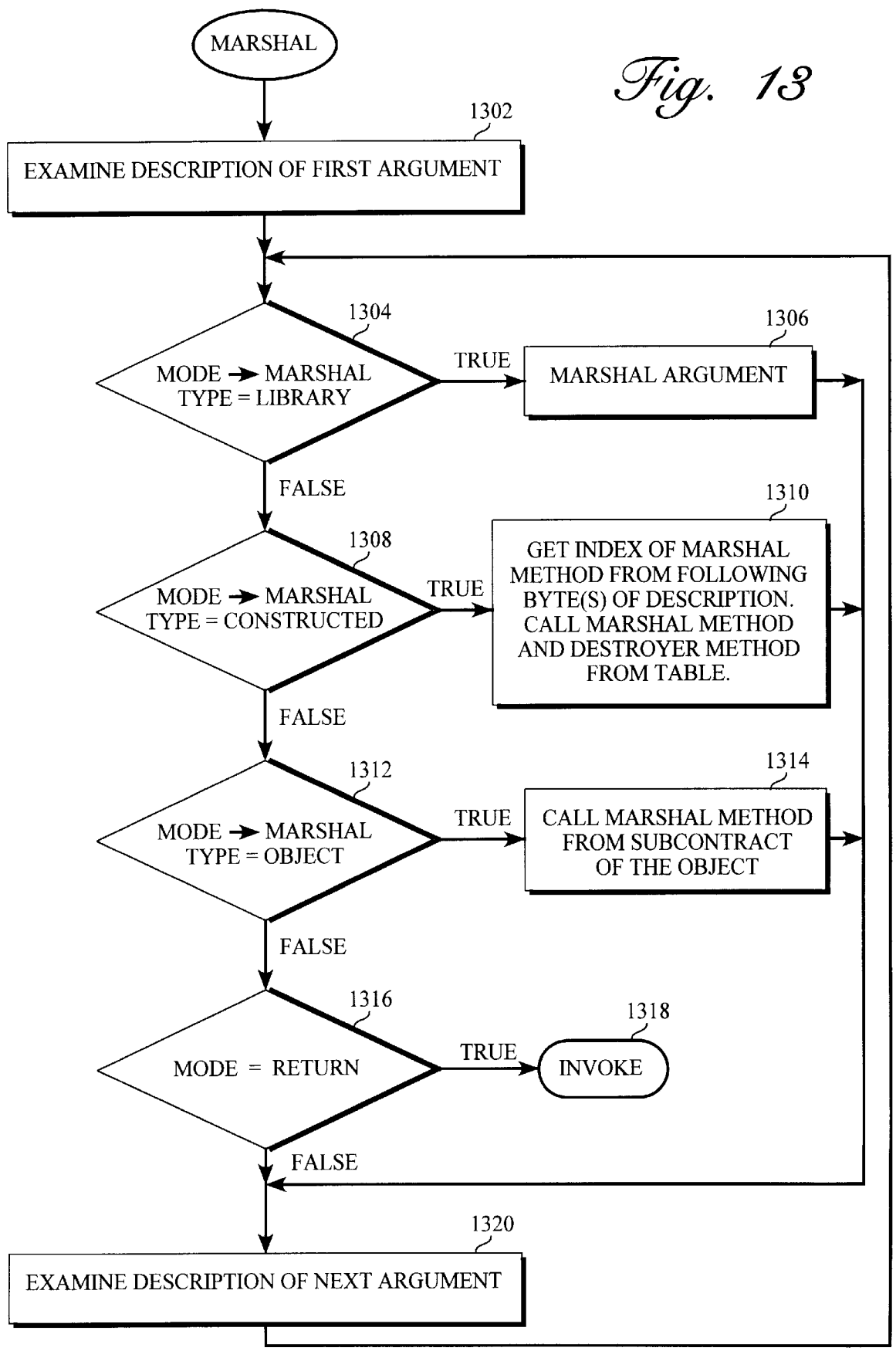
Figure 14:
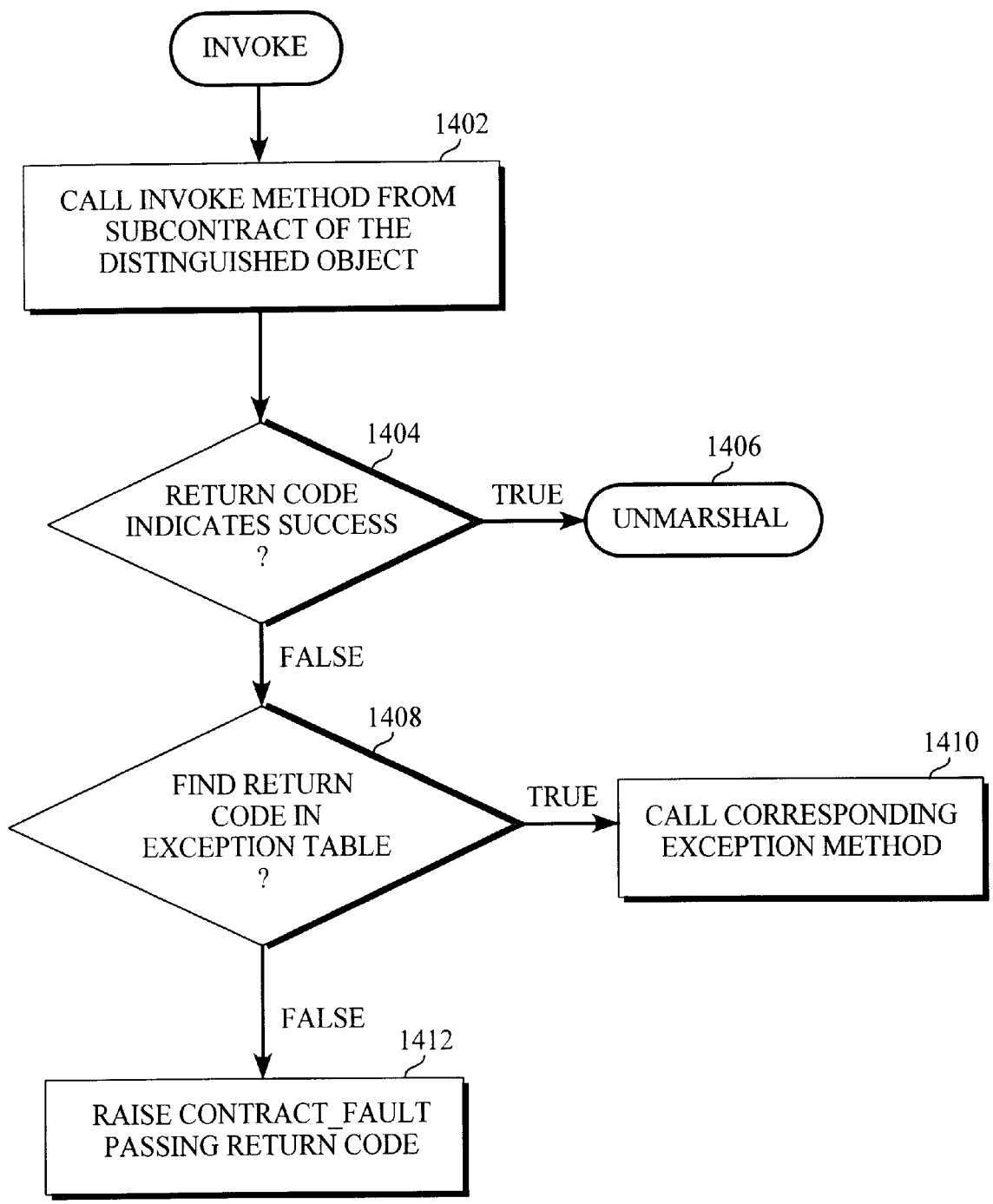
Figure 15:
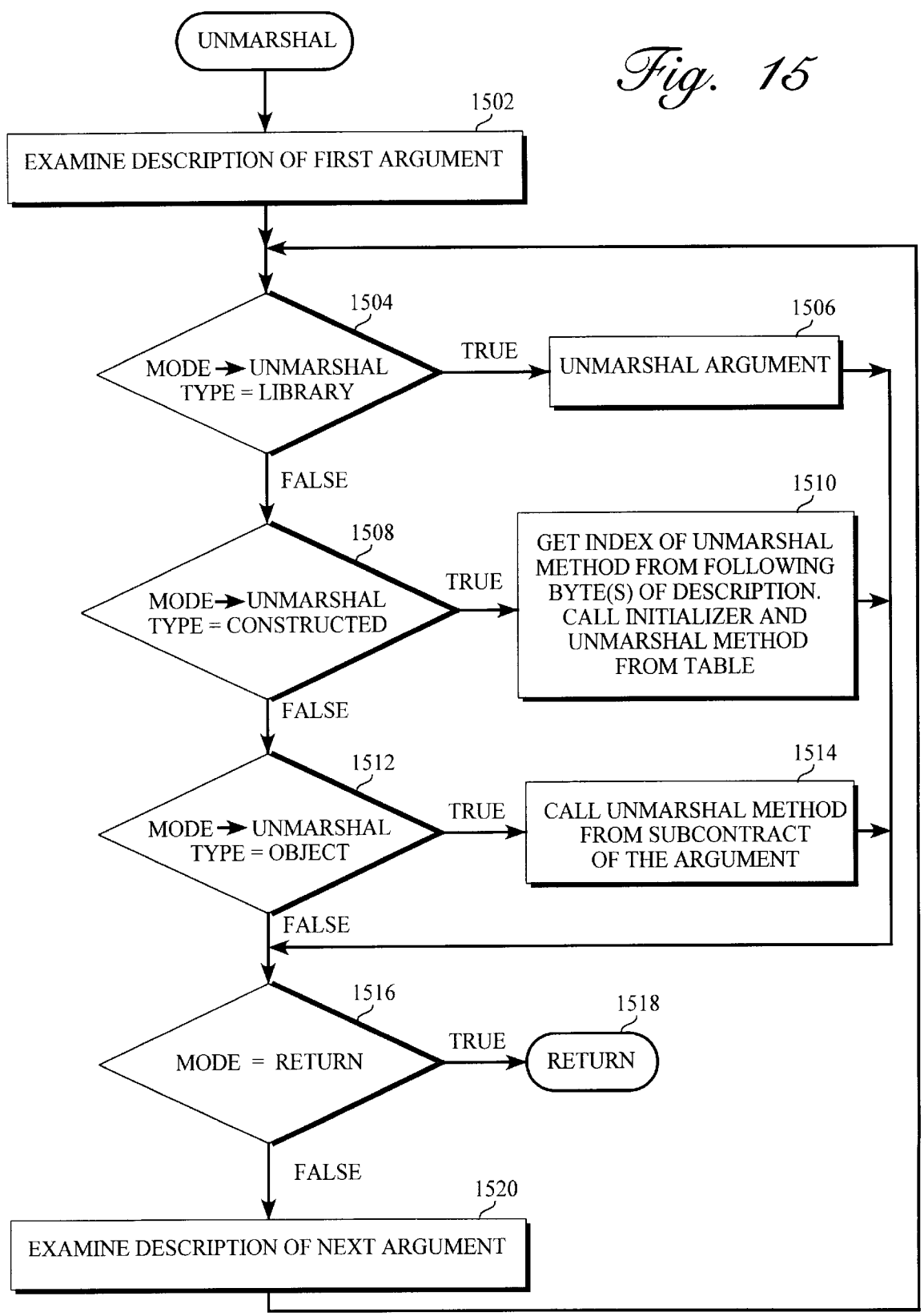

5. The SX marshal_copy code arranges for information describing a copy of X to be put in the argument buffer and returns to stub fred 64.
6. The client-side stub code has now marshalled all the arguments and is now ready to actually execute the call. So it calls A's invoke operation 70.
7. The SA invoke method performs the work necessary to transmit the argument buffer to the target server, with a request that an invocation on the fred method occurs on the server state for the object A, and then awaits a result buffer back from the server 72.
8. Referring now to FIG. 7, the call is received by the target server and the data delivered to server-side subcontract SSA who delivers the buffer to server-side stub S2 74,76. Stub S2 checks to see if there are arguments to unmarshal 78 and then to see if any of the arguments are objects 80. Finding that there is an object X to be unmarshaled, server-side stub S2 invokes the unmarshal operation of the SSA subcontract 82. Subcontract SSA checks object X's subcontract id to find that it has subcontract SX associated with it 84. Subcontract SSA then invokes the unmarshal operation on subcontract SX 84, and subcontract SX unmarshals object X returning it to subcontract SSA who in turn returns it to stub S2 86. Server-side stub S2 having completed the unmarshaling of all arguments received, passes the call and arguments to the targeted object implementation 92, and awaits a reply 94. The object implementor processes the call and creates an object fruitbat-1 with subcontract SF and a server-side subcontract SSF and instructs subcontract SSF to act as server-side subcontract for subcontract SF 96. Subcontract SSF creates an internal state to identify F1 96, and returns object F1 that points to this state 98. Object implementor now returns object F1 to server-side stub S2 forreturn to the client 100. Referring now to FIG. 8, Stub S2 now must go through the marshaling of arguments routine again to marshal object fruitbat 104,106, 108, 110, and 112, with subcontract SSF 112 returning the marshaled arguments to stub S2 who delivers the marshaled data to the server-side subcontract SSA for retransmission to client-side subcontract SA 116, 114.
9. The client-side stub code now receives the result buffer from the SA invoke method 130 and wishes to start unmarshalling the results. In this case the result is known to be an object of type fruitbat, which has subcontract SF, so client-side stub fred (SA) invokes the unmarshal operation of the SF subcontract, passing in the regular method table for the type fruitbat. The invocation steps are shown in blocks 142,134,136,138 and more fully described in the discussion on compatible objects in the above referenced copending application.
10. The SF subcontract unmarshal code now attempts to unmarshal an object from the result buffer. It combines the information from the result buffer with its own subcontract method table and with the regular method table it was passed to form a new SPRING object F2, which it passes back to the client-side stub 140.
11. The client-side stub fred has now completed its task and can return the result object to application level 148.

The process has been driven by the client-side stub code for A's fred method, but has also involved the subcontracts for the target object, for the argument object and for the result object.

The Client-side Stub Generator and Interpreter

As indicated in this exemplary description of the usage of stubs and subcontracts, the client-side stub is the primary interface to the client. Because of the number of client-stubs which are generated in an object oriented, distributed system it became appropriate to consider ways of reducing the text memory space occupied by the code of these client-side stubs. Referring again to FIG. 2, the mechanism used to reduce this memory space comprises a stub generator (called "CONTOCC") 152, a data base of client-side stub description files (reduced stub code) 156 and a stub-interpreter 158 which knows how to read these client-side stub description files. CONTOCC 152 reads interface definition language ("IDL") files 150 and generates corresponding C++ files. CONTOCC 152 has the ability to read the IDL data 150 and generate either normal C++ stub files 154 or the special client-side stub interpreter files 158 described in more detail below.

Client-side Stubs

Client-side stubs are generated by CONTOCC to provide C++ methods that clients can call that will result in the execution of operations on IDL objects. The stubs consist of a mechanism for handling multiple inheritance, and a mechanism for performing SPRING object invocation.

SPRING object invocation is achieved by marshaling the arguments to the call into a linear data structure, called a transport, invoking a method on the distinguished object to the call, and unmarshaling the results of the call (or handling an exception, if one is raised). Because of Spring's subcontract mechanism, the client-side stubs are not responsible for the details of marshaling or unmarshaling parameter objects, nor are they responsible for the actual invocation. The client-side stubs are responsible for making sure that the arguments and results get marshaled and unmarshaled in the appropriate order, and for calling the subcontract of the distinguished object to perform the operation invocation.

For an example, the IDL interface:

```
interface param { };
interface res { };
exception that { long reason; };
interface face {
    res thod(copy param arg, copy long input, produce long output)
        raises (that);
};
``` has one method (thod) that takes one argument of type param (arg), one argument of type long (input), produces one long argument (output), and returns a result of type res (unnamed), unless it raises an exception (that), in which case a long (reason) will be passed as a parameter of the exception. The CONTOCC translator used to (always, and still can, optionally) produce the following code as part of the client-side stub for the above interface:

```
res_fp
face_methods::thod(any_obj *obj,
            param_fp arg_arg,
            int arg_input)
    raises that, contract_fault
```

-continued

```
    return r
{
    transport t;
    obj->sc->invoke__reamble(obj, t);
    arg_arg->_marshal_copy(t);
    t.put_int(ar_input);
    int s = obj->sc->invoke(obj, t, face_codes::f_thod);
    switch (s) {
        case isoh::ok:
            r = res::_unmarshal(t);
            break;
        case face_codes::e_that:
            unmarshal_and_raise_that (t);
        default:
            raise contract_fault(s);
    }
}
```

The important thing to realize about this code is that much of it is identical in all such client-side stub methods, and that the changeable parts can be described reasonably succinctly. Those observations led to the idea of an interpreter for client-side stubs.

The variable parts of a client-side stub method are shown above in bold face font. The types and modes of the parameters will vary from one stub method to the next, though the distinguished object is always of type "any_obj *". and is always the first parameter. The exceptions raised by different stub methods may be different. The different parameters have to be marshaled in different ways, though the marshaling method for library types is well known, and the marshaling for objects and constructed types (array, struct, etc.) is accomplished by calling a marshal method for the type. Invocation is done by calling a subcontract method: the only variable here between stub methods is the identification of the operation being invoked. Unmarshaling varies just like marshaling: again it is well-known for library types, and any objects or constructed types are unmarshaled by calling unmarshal methods. Any exceptions that need to be raised are encoded as a return code from the invoke call, and unmarshaling the parameters to the exception and raising it are encapsulated in a method. (It is noted, however, that unmarshaling the parameters to an exception and raising the exception was previously generated inline, but making that a separate method in the preferred embodiment potentially saves space even in the C++ coded stubs.)

An Interpreter for Client-side Stubs

Given the limited variability that was observed in C++ coded stubs, an interpreter is provided, whose main body is the fixed parts of a C++ coded stub, and which consults a table describing the variable parts and acts accordingly given that description. Since saving space was the primary objective of using a table driven stub interpreter, in the preferred embodiment, the table was made as compact as practical.

The description of a stub consists of several kinds of information: types and modes of arguments, marshal and unmarshal methods for parameters and results that need those methods, the identification of the operation to be performed, and a mapping from exception identifiers to methods that unmarshal the parameters of the exception and raise it. In addition, there are various other data that are needed, as will be detailed below. The descriptions of collections of stubs include a fair amount of common information, so the descriptions for a module (a collection of interfaces, which are collections of operations) are lumped together into a single table.

In the preferred embodiment, there are currently 9 parameter passing modes that are recognized by the stub interpreter. copy, share, consume, produce (also used for "out"), borrow, in, in-out, and return. There are 16 parameter types that are recognized by the stub interpreter: bool, octet, char, short, long, long long, unsigned short, unsigned long, unsigned long long, float, double, string, struct (also used for unions and builtins), array, object, and void (used only for void returns). Each of the mode and the type can be encoded in 4 bits, and the combinations fit conveniently in a byte. Each parameter (and the return type) to a method is encoded as at least one byte. The parameter descriptors for all the parameters of an operation are stored one after another. The parameter description for each operation is terminated by a byte containing 0x00, and padded (if necessary) with bytes containing 0xff to the next 4-byte boundary, for ease of addressing. (While the presently preferred embodiment uses this null byte to terminate the method's parameter description, an alternate embodiment is possible which could save this byte as well as up to three bytes of padding. This alternate method of recognizing the end of a method's data in this table is possible because the stub interpreter knows that it is at the end of a description when it sees a byte with the mode "return.") Finally, the operation identifier is stored as a 4-byte unsigned integer before the bytes describing the parameters of the operation. An exemplary picture of the layout of the client-side stub description is shown in FIG. 11.

Library types are marshaled and unmarshaled by well-known code at the appropriate points in the stub interpreter. Object parameters are marshaled by calling through to their appropriate subcontract marshal method (marshal_copy or marshal_consume, depending on the mode in the descriptor). When objects need to be unmarshaled, the address of their unmarshal method is stored elsewhere in the description, and the index of that address is stored after the (mode, type) pair. The same solution is adopted for finding the marshal and unmarshal methods for parameters of constructed types. If both a marshal and unmarshal method are needed for the parameter (eg., it is a borrow parameter), the marshal method is stored at the given index, with the unmarshal method following it, accessed at the given index +1.

These indices (and any other indices in the descriptors) are usually small (since the descriptors are usually small), so the following encoding is used for them: if the index fits in 7 bits, it is stored in one byte, with the most-significant bit cleared; if it does not fit in 7 bits, the most-significant 7 bits are stored in the first byte, with the most-significant bit set, and successive 7-bit chunks of the index are stored in successive bytes, the most-significant bit of each byte indicating that less-significant 7-bit chunks are needed to complete the number.

If a struct, union, or builtin parameter is produced or returned by the call, the stub interpreter needs to call an initializer for the type before calling the unmarshal method. In that case, the address of an initializer method is stored in the description, after the unmarshal method. For struct, union, and builtin parameters that are passed consume, the stub interpreter also needs to call a method to clean up the parameter after it is marshaled. The address of a destroyer for the parameter is stored in the description, after the marshal method. The actual order of the methods in the description for struct, union, or builtin parameters is: marshal_consume, unmarshal (possibly accessed at marshal_consume +1), destroyer (accessed at marshal_consume +2), and initializer (accessed at unmarshal +2).

In the preferred embodiment, no checking is done on the method addresses used by the stub interpreter to call marshal, unmarshal, initializer, or destroyer methods. The stub generator is assumed to have gotten the right methods into the expected slots and filled in the indices correctly. In fact, the stub interpreter does not distinguish between marshal_consume and marshal_copy methods for parameters of constructed types. It assumes it is given the index of the appropriate method in the table.

All the exceptions that can be raised by a module are gathered together into a map from exception identifiers to addresses of the methods that unmarshal any arguments to the exception and raise the exception. When the stub interpreter detects that an exception has been raised, it searches the table for the exception identifier and calls the corresponding method to raise the exception. A method call was used instead of having the stub interpreter itself raise the exception because a way to raise arbitrary exceptions from the stub interpreter itself is difficult to organize.

Referring again to FIG. 11, for compactness, the various bytes and tables describing a module are stored contiguously, so that a single index into the description is enough to find all the information needed for any particular operation invocation. First we store the table of unmarshal, etc., methods 200, prefixed by the number of entries in the table. Next comes the table of exceptions 202, again prefixed by the number of entries. Then come the actual method descriptors themselves 204, each consisting of the operation identifier, an index 206, which is used to get from the operation description to the tables at the front of the description; followed by the bytes and indices 208 that describe the parameters to the operation. These bytes include a description of the return type of the function 210. Null padding 212, if required, follows each operation byte group to make those descriptors fill a multiple of 4 bytes. Each function description includes at least the function code 204, the distance back to the beginning of the description (to access the tables of methods) 206, and a descriptor for the return type of the function 210. The minimum function descriptor is 12 bytes, for a function with up to 3 unconstructed arguments an an unconstructed return value. If a type does not need an index to unmarshal, etc methods, then the index is omitted. The description of the example IDL interface above is:

```
static int example_stub_descriptors[ ] =
{
    1,
    (int)res::_unmarshal,
    1,
    face_codes::e_that,
    (int)unmarshal_nd_raise_that,
    face_codes::f_thod,
    6,
    STUB_BYTES(STUB_ARG(m_copy,t_object),
        STUB_ARG(m_copy,t_int32),
        STUB_ARG(m_returns,t_object).
        0)
};
```

Preferred Embodiment Implementation Details

The stub interpreter is mostly straightforward C++ code. This section explains the details used in the preferred embodiment.

When CONTOCC is told to generate client-side stubs using the interpreter, it still generates a method for the client to call, but that method simply calls the stub interpreter. The purpose of the method is to isolate the client from the existence of the interpreter, e.g., by giving the client a proper C++ method declaration to call.

Polymorphic Return Types

The stub interpreter needs to be able to return various types of results, as if it were the various C++ coded stubs. Ordinary C++ code can only return the type it is declared to return. In he preferred embodiment, the SPRING operating system, of which this invention is a part, is designed to run on SPARC® architecture based systems. (SPARC is a registered trademark of SPARC International and is an acronym for "Scalable Performance ARChitecture" based upon a RISC computer architecture developed by Sun Microsystems, Inc.) On the SPARC architecture, the conventions for returning various different types of results require putting those results invariousdifferent places (e.g., registers for most results, pre-allocated memory for others, etc.). (See Appendix D, "Software Considerations", The SPARC Architecture Manual, version 8, Prentice Hall, 1992, ISBN 0-13-825001-4.) To accomplish polymorphic returns, the stub interpreter resorts to a small number of assembler methods. These methods take the various kinds of return results as parameters and put them in the conventional places for return results. These methods are actually inlined, and do not allocate a register window or stack frame, so they can access the registers and stack frame of the interpreter itself.

Polymorphic, Variadic, Parameter Types

The stub interpreter needs to access the same parameters as would be passed to the C++ coded stubs. The interpreter cannot know before hand the numberor types of the parameters that are passed to the client-side stub. In addition, the interpreter needs to get a pointer to the appropriate entry in the operation descriptions for the method being invoked. In the preferred embodiment, both of these problems are solved by a kind of tail call from the C++ method the client calls to the stub interpreter.

A client of the above example interface would call a method defined as:

```
res_fp
face_methods::thod(any_obj *obj, param_fp arg_arg, int arg_input)
    raises that, contract_fault
{
    stub_code::processor (&example_stub_descriptors [5]);
    return
        *(res_fp*)stub_code::panic(obj, &arg_arg, &arg_input);
}
```

The purpose of the return statement is to keep the parameters to this method live across the first line of code, while generating as little code as possible. The return statement is never reached. (That is, if everything goes according to plan. If that line is reached, the system panics.) The purpose of the first line of code is to transfer control to the stub interpreter itself, passing it the address of the description for the operation to be invoked.

When control is transferred to the stub interpreter, the arguments to the client-side stub (including the distinguished object, etc.) are in the first several in registers or in the frame of the caller in the usual SPARC calling convention. (See the above reference to Appendix D of the SPARC Architecture Manual.) The address of the description for the operation is in the first out register. Note that in this preferred embodiment, copying the arguments to the client-side stub from one register window to the next has been avoided. In order not to lose the arguments from the in registers, the stub interpreter does not allocate a new register/memory frame. Instead it extends the memory frame of the client-side stub as needed for the local variables of the interpreter. (Extending the memory frame without pushing a register frame is accomplished by having the C++ compiler generate assembler code for the stub interpreter and changing the save instruction for the interpreter method to an add instruction.) In order not to lose the address of the operation description from the outregister, the first thing the stub interpreter does is copy that address to a local register variable. Thus, we are running in the stub interpreter with the arguments in the usual registers and having passed the address of the operation description in one jump, one add, and one register copy. Since the stub interpreter is running in the register frame of the client-side stub, the methods that return the polymorphic return values return from the stub interpreter directly to the client code (i.e., without executing the panic in the client-side stub).

In the preferred embodiment the stub interpreter has to access the arguments to the client-side stub as it finds out what their types are from the byte codes in the description data base. The first thing the interpreter does with the arguments to the client-side stub is to copy the arguments from the in registers to the space allocated for them in the client's (caller's) frame, so they can be addressed sequentially along with any arguments passed in memory. The interpreter is designed to handle the standard conventions for passing various C++ elements (e.g., structs are passed by reference, etc.). and the conventions for the various MDL parameter passing modes (e.g., borrow parameters are passed by reference, etc.). In that way it can access the arguments to the client-side stub appropriately as it processes the byte code description.

The interpreter itself is essentially two loops over the byte code description. The first loop examines each byte code to see if it requires marshaling any arguments. Then the indicated operation is invoked on the distinguished object and the return code is examined. If the operation succeeded, the second loop over the byte code description determines if any results need unmarshaling. When this second loop examines the byte code describing the return type of the operation, the appropriate polymorphic return method is called to return from interpreter to the client. If the operation invocation failed, the return code is used to map to a method that will unmarshal the parameters to, and raise, the appropriate exception.

There is no conceptual problem with building an interpreter for server-side stubs. However, this was not done in the preferred embodiment for several reasons.

Whereas a domain might be a client of a larger number of services, it is typically a server for only a small number of services. Thus, while the domain might need many client-side stubs, it would need only a few server-side stubs. Therefore, reducing the space occupied by server-side stubs would have a relatively smaller benefit than reducing the space occupied by client-side stubs.

It was possible to figure out the calling environment of the client-side stubs without too much knowledge of the conventions of the C++ compiler beyond the usual calling conventions on the SPARC. In contrast, the server-side stubs have to call to the implementations of the server methods, typically through C++ vtables. Since vtable dispatch is subject only to the whims of the C++ compiler writer, it was not deemed desirable to be tied to a particular C++ implementation.

Basic operation of the stub interpreter in the preferred embodiment is depicted in FIGS. 12–15. The stub interpreter comprises four parts: setup (shown in FIG. 12), marshalling (shown in FIG. 13), invocation (shown in FIG. 14) and unmarshalling (shown in FIG. 15).

While the invention has been described in terms of a preferred embodiment in a specific context and operating system environment, those skilled in the art will recognize that the invention can be practiced, with modification, in other contexts, whether they be object oriented or not, and in different operating systems within the spirit and scope of the appended claims.

What is claimed is:

1. A computer implemented method for processing a request from a client to a server to invoke a method of the server, comprising the acts of:

receiving a request from a client to invoke a particular method of a server;

accessing a compact description associated with said particular method, said compact description comprising information specific to said particular method which determines the manner in which said request is to be processed, said compact description being in a form which is not directly executable;

interpreting said compact description, at run time, to determine the manner in which said request is to be processed;

processing said request in accordance with the specific information contained in said compact description to derive a transformed request having a form suitable for submission to an underlying communication mechanism; and invoking the underlying communication mechanism to send said transformed request to the server.

2. The method of claim 1, wherein the act of processing comprises the acts of:

supplying a base set of functionality which is common to a plurality of methods;

incorporating the specific information contained in said compact description with said base set of functionality to derive a customized set of functionality; and carrying out said customized set of functionality to process said request.

3. The method of claim 1, wherein said compact description is stored in one or more tables.

4. The method of claim 1, wherein said request includes one or more arguments, and wherein said compact description comprises information on the types and modes of arguments.

5. The method of claim 1, wherein said request includes one or more arguments, and wherein said compact description comprises information on marshaling and unmarshaling of arguments.

6. The method of claim 1, wherein said compact description comprises exception handling information.

7. The method of claim 1, wherein said compact description is stored as a plurality of compressed byte codes.

8. The method of claim 1, wherein said request includes an argument, and wherein said argument comprises an object.

9. The method of claim 1, wherein the client and server are objects residing on different machines in a distributed system.

10. The method of claim 1, wherein the client and server are objects residing on the same machine.

11. An apparatus for processing a request from a client to a server to invoke a method of the server, comprising:

a mechanism for receiving a request from a client to invoke a particular method of a server;

a storage for storing a compact description associated with said particular method, said compact description comprising information specific to said particular method which determines the manner in which said request is to be processed, said compact description being in a form which is not directly executable;

a mechanism for accessing, in response to said request, said compact description from said storage;

a mechanism for interpreting said compact description, at run time, to determine the manner in which said request is to be processed;

a mechanism for processing said request in accordance with the specific information contained in said compact description to derive a transformed request having a form suitable for submission to an underlying communication mechanism; and a mechanism for invoking the underlying communication mechanism to send said transformed request to the server.

12. The apparatus of claim 1, wherein the mechanism for processing comprises:

a mechanism for supplying a base set of functionality which is common to a plurality of methods;

a mechanism for incorporating the specific information contained in said compact description with said base set of functionality to derive a customized set of functionality; and a mechanism for carrying out said customized set of functionality to process said request.

13. The apparatus of claim 1, wherein said compact description is stored in said storage in one or more tables.

14. The apparatus of claim 1, wherein said request includes one or more arguments, and wherein said compact description comprises information on the types and modes of arguments.

15. The apparatus of claim 1, wherein said request includes one or more arguments, and wherein said compact description comprises information on marshaling and unmarshaling of arguments.

16. The apparatus of claim 1, wherein said compact description comprises exception handling information.

17. The apparatus of claim 1, wherein said compact description is stored in said storage as a plurality of compressed byte codes.

18. The apparatus of claim 1, wherein said request includes an argument, and wherein said argument comprises an object.

19. The apparatus of claim 1, wherein the client and server are objects residing on different machines in a distributed system.

20. The apparatus of claim 1, wherein the client and server are objects residing on the same machine.

21. A computer program product for processing a request from a client to a server to invoke a method of the server, comprising:

code for causing one or more processors to receive a request from a client to invoke a particular method of a server;

code for causing one or more processors to access a compact description associated with said particular method, said compact description comprising information specific to said particular method which determines the manner in which said request is to be processed, said compact description being in a form which is not directly executable;

code for causing one or more processors to interpret said compact description, at run time, to determine the manner in which said request is to be processed;

code for causing one or more processors to process said request in accordance with the specific information contained in said compact description to derive a transformed request having a form suitable for submission to an underlying communication mechanism; and code for causing one or more processors to invoke the underling communication mechanism to send said transformed request to the server.

22. The computer program product of claim 21, wherein the code for causing one or more processors to process said request comprises:

code for causing one or more processors to supply a base set of functionality which is common to a plurality of methods;

code for causing one or more processors to incorporate the specific information contained in said compact description with said base set of functionality to derive a customized set of functionality; and code for causing one or more processors to carry out said customized set of functionality to process said request.

23. The computer program product of claim 21, wherein said compact description is stored in one or more tables.

24. The computer program product of claim 21, wherein said request includes one or more arguments, and wherein said compact description comprises information on the types and modes of arguments.

25. The computer program product of claim 21, wherein said request includes one or more arguments, and wherein said compact description comprises information on marshaling and unmarshaling of arguments.

26. The computer program product of claim 21, wherein said compact description comprises exception handling information.

27. The computer program product of claim 21, wherein said compact description is stored as a plurality of compressed byte codes.

28. The computer program product of claim 21, wherein said request includes an argument, and wherein said argument comprises an object.

29. The computer program product of claim 21, wherein the client and server are objects residing on different machines in a distributed system.

30. The computer program product of claim 21, wherein the client and server are objects residing on the same machine.

* * * * *